(12) United States Patent
Rouse et al.

(10) Patent No.: US 10,449,441 B2
(45) Date of Patent: *Oct. 22, 2019

(54) NOTIFYING USERS OF OPTIONS TO PARTICIPATE IN META GAMES

(71) Applicant: Zynga Inc., San Francisco, CA (US)

(72) Inventors: Justin Rouse, Plano, TX (US); Kevin Holme, San Francisco, CA (US); Daniel Hurd, Dallas, TX (US); Jason Tomlinson, Fairview, TX (US); Grant Yang, Mckinney, TX (US); Shawn Lohstroh, Plano, TX (US); Jessica Oyhenart, Dallas, TX (US); David Chow, Allen, TX (US)

(73) Assignee: Zynga Inc., San Francisco, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/785,748

(22) Filed: Oct. 17, 2017

(65) Prior Publication Data

US 2018/0036633 A1  Feb. 8, 2018

Related U.S. Application Data

(63) Continuation of application No. 14/935,610, filed on Nov. 9, 2015, now Pat. No. 9,833,699, which is a
(Continued)

(51) Int. Cl.
*A63F 9/24* (2006.01)
*A63F 13/216* (2014.01)
(Continued)

(52) U.S. Cl.
CPC ............ *A63F 13/216* (2014.09); *A63F 13/12* (2013.01); *A63F 13/46* (2014.09); *A63F 13/795* (2014.09);
(Continued)

(58) Field of Classification Search
CPC ...... A63F 13/46; A63F 13/216; A63F 13/795; A63F 13/798
See application file for complete search history.

(56) References Cited

U.S. PATENT DOCUMENTS 6,756,882 B2  6/2004  Benes et al.
6,761,638 B1  7/2004  Narita
(Continued)

OTHER PUBLICATIONS

"U.S. Appl. No. 13/215,689, Appeal Brief filed Jul. 22, 2013", 14 pgs.
(Continued)

*Primary Examiner* — Steve Rowland
(74) *Attorney, Agent, or Firm* — Schwegman Lundberg & Woessner, P.A.

(57) ABSTRACT

In a method of notifying a user of an option to participate in a meta game, a presence of a player of a computer-implemented game at a location is detected. An association between a computer-implemented meta-game and the location is identified. The player of the computer-implemented game is presented with an option to participate in the computer-implemented meta-game. An indication of an acceptance of the option to participate in the computer-implemented meta game is received from the player of the computer-implemented game. A performance of an action within the computer-implemented game by the player of the computer-implemented game is reflected within the computer-implemented meta game.

20 Claims, 13 Drawing Sheets

Related U.S. Application Data continuation of application No. 13/244,818, filed on Sep. 26, 2011, now Pat. No. 9,185,534, which is a continuation of application No. 13/215,689, filed on Aug. 23, 2011, now Pat. No. 9,440,146.

(51) Int. Cl.

| | |
|---|---|
| *A63F 13/798* | (2014.01) |
| *A63F 13/46* | (2014.01) |
| *A63F 13/795* | (2014.01) |
| *H04W 4/21* | (2018.01) |
| *H04W 4/02* | (2018.01) |
| *H04L 29/08* | (2006.01) |
| *H04L 29/06* | (2006.01) |
| *G06F 3/048* | (2013.01) |
| *A63F 13/30* | (2014.01) |

(52) U.S. Cl.
CPC ............ *A63F 13/798* (2014.09); *G06F 3/048* (2013.01); *H04L 67/18* (2013.01); *H04L 67/38* (2013.01); *H04W 4/02* (2013.01); *H04W 4/21* (2018.02); *A63F 2300/513* (2013.01); *A63F 2300/556* (2013.01); *A63F 2300/558* (2013.01); *A63F 2300/5566* (2013.01); *A63F 2300/5573* (2013.01); *A63F 2300/61* (2013.01)

(56) References Cited

U.S. PATENT DOCUMENTS

| | | |
|---|---|---|
| 8,162,756 B2 | 4/2012 | Amaitis et al. |
| 9,185,534 B2 | 11/2015 | Rouse et al. |
| 9,440,146 B1 | 9/2016 | Rouse et al. |
| 2003/0195044 A1 | 10/2003 | Narita |
| 2004/0215756 A1 | 10/2004 | VanAntwerp et al. |
| 2007/0218997 A1 | 9/2007 | Cho |
| 2009/0017913 A1 | 1/2009 | Bell et al. |
| 2009/0075738 A1 | 3/2009 | Pearce |
| 2013/0053149 A1 | 2/2013 | Rouse et al. |
| 2016/0062521 A1 | 3/2016 | Rouse et al. |

OTHER PUBLICATIONS

"U.S. Appl. No. 13/215,689, Appeal Decision mailed Feb. 29, 2016", 9 pgs.

"U.S. Appl. No. 13/215,689, Final Office Action dated Jan. 18, 2013", 10 pgs.

"U.S. Appl. No. 13/215,689, Non Final Office Action dated Aug. 7, 2012", 8 pgs.

"U.S. Appl. No. 13/215,689, Notice of Allowance dated May 16, 2016", 7 pgs.

"U.S. Appl. No. 13/215,689, PTO Response to Rule 312 Communication dated May 16, 2016", 1 pgs.

"U.S. Appl. No. 13/215,689, PTO Response to Rule 312 Communication dated Jun. 3, 2016", 2 pgs.

"U.S. Appl. No. 13/215,689, Reply Brief filed Nov. 19, 2013", 7 pgs.

"U.S. Appl. No. 13/215,689, Response filed Apr. 29, 2016 to Appeal Decision mailed Feb. 29, 2016", 6 pgs.

"U.S. Appl. No. 13/215,689, Response filed Nov. 5, 2012 to Non Final Office Action dated Aug. 7, 2012", 9 pgs.

"U.S. Appl. No. 13/244,818, Appeal Brief filed Sep. 24, 2012", 19 pgs.

"U.S. Appl. No. 13/244,818, Appeal Decision mailed Apr. 20, 2015", 7 pgs.

"U.S. Appl. No. 13/244,818, Decision on Pre-Appeal Brief Request mailed Aug. 27, 2012", 2 pgs.

"U.S. Appl. No. 13/244,818, Examiner's Answer to Appeal Brief mailed Dec. 7, 2012", 6 pgs.

"U.S. Appl. No. 13/244,818, Final Office Action dated Apr. 25, 2012", 9 pgs.

"U.S. Appl. No. 13/244,818, Non Final Office dated Jan. 3, 2012", 11 pgs.

"U.S. Appl. No. 13/244,818, Notice of Allowance dated Jul. 1, 2015", 5 pgs.

"U.S. Appl. No. 13/244,818, Pre-Appeal Brief Request filed Jul. 25, 2012", 5 pgs.

"U.S. Appl. No. 13/244,818, Response filed Apr. 3, 2012 to Non Final Office Action dated Jan. 3, 2012", 14 pgs.

"U.S. Appl. No. 14/935,610, Final Office Action dated Mar. 21, 2017", 9 pgs.

"U.S. Appl. No. 14/935,610, Non Final Office Action dated Aug. 29, 2016", 8 pgs.

"U.S. Appl. No. 14/935,610, Notice of Allowance dated Aug. 2, 2017", 7 pgs.

"U.S. Appl. No. 14/935,610, Preliminary Amendment filed Nov. 12, 2015", 5 pgs.

"U.S. Appl. No. 14/935,610, Response filed Jan. 26, 2017 to Non Final Office Action dated Aug. 29, 2016", 14 pgs.

"U.S. Appl. No. 14/935,610, Response to Non Final Office Action dated Mar. 21, 2017", 13 pgs.

NOTIFYING USERS OF OPTIONS TO PARTICIPATE IN META GAMES

CROSS REFERENCE TO RELATED APPLICATIONS

This application is a continuation of U.S. patent application Ser. No. 14/935,610, filed on Nov. 9, 2015, which is a continuation of U.S. patent application Ser. No. 13/244,818, filed on Sep. 26, 2011, which is a continuation of U.S. patent application Ser. No. 13/215,689, filed on Aug. 23, 2011, the benefit of priority of each of which is claimed hereby, and each of which are incorporated by reference herein in its entirety.

TECHNICAL FIELD

The present application relates generally to the technical field of implementing social games, and, in one specific example, to managing location-based meta games corresponding to computer-implemented social games.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends," A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not limitation in the figures of the accompanying drawings in which.

DETAILED DESCRIPTION

In various embodiments, methods and systems of notifying users of options to participate in meta games are disclosed. A presence of a player of a computer-implemented game at a location is detected. An association between a computer-implemented meta-game and the location is identified. The player of the computer-implemented game is presented with an option to participate in the computer-implemented meta-game. An indication of an acceptance of the option to participate in the computer-implemented meta game is received from the player of the computer-implemented game. A performance of an action within the computer-implemented game by the player of the computer-implemented game is reflected within the computer-implemented meta game.

Figure 1:
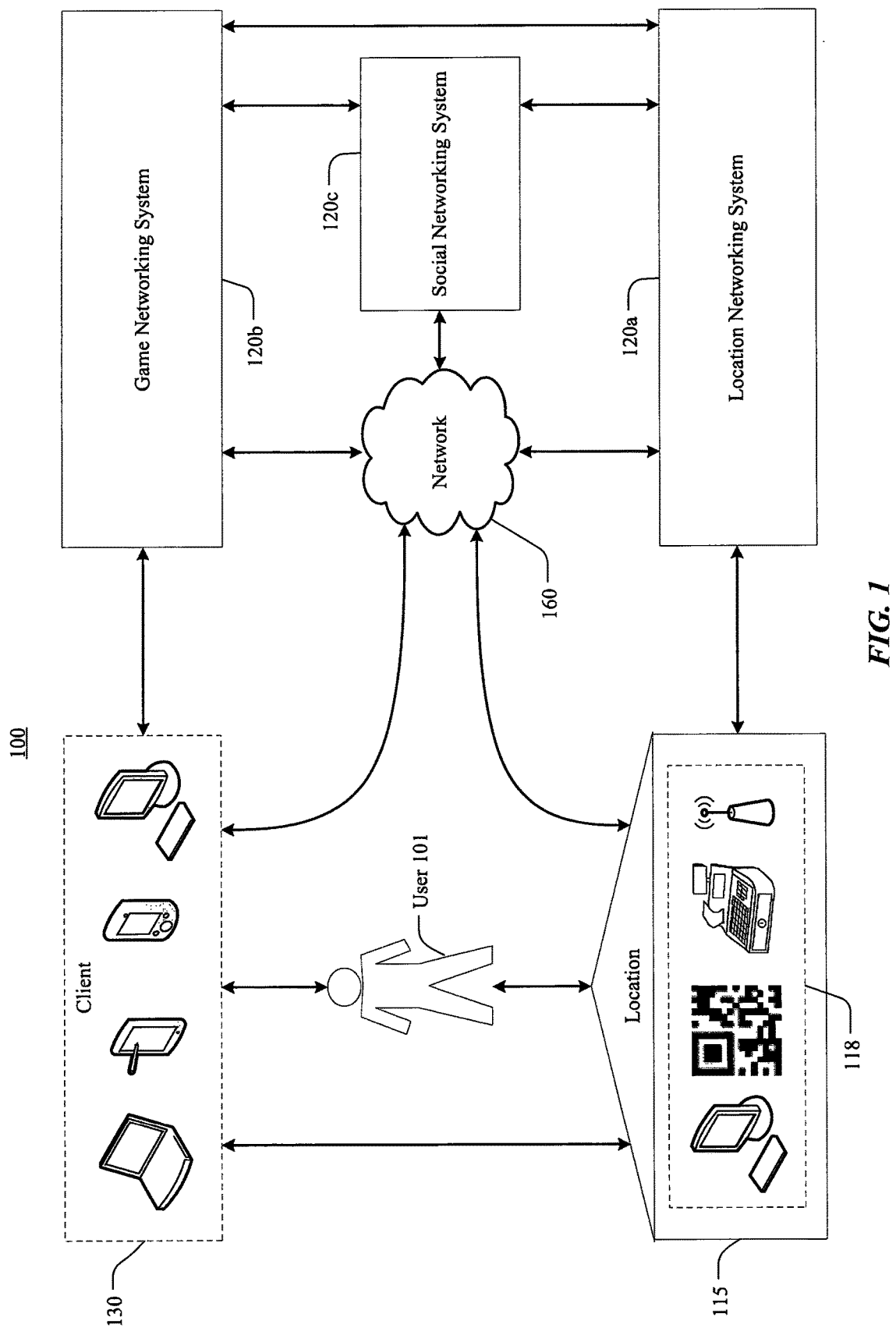
FIG. 1 is a block diagram illustrating an example of a system for implementing various disclosed embodiments.

FIG. 1 is a block diagram illustrating an example of a system 100 for implementing various disclosed embodiments. In various embodiments, the system 100 comprises user 101, location 115, verification system 118, location networking system 120a, game networking system 120b, client system 130, and network 160. The components of system 100 can be connected to each other in any suitable configuration, using any suitable type of connection. The components may be connected directly or over a network 160, which may be any suitable network (e.g., the Internet).

User 101 is a player of one or more online computer games. Game networking system 120b is a network-addressable computing system that hosts the one or more online games. Game networking system 120b can generate, store, and transmit game account data and game state data associated with one or more users. An online game can be accessed by client system 130 directly, via network 160, or via a third-party system (e.g., a social networking site). Client system 130 can be any suitable computing device, such as a personal computer, laptop, cellular phone, smart phone, computing tablet, and the like. Location 115 is a physical place that has one or more location attributes associated with it. User 101 can visit location 115 and perform one or more location-based actions there. Location 115 can contain one or more verification systems 118, which can verify if and when user 101 has performed a location-based action at location 115. Location 115 may also be a "logical" place that has one or more location attributes associated with it. For example, a location may be a chain coffee shop (e.g., Starbucks) that has many physical places (e.g., Moscow, Johannesburg, San Francisco, etc.) Thus, a user may perform a location-based action at a logical Starbucks location by performing the location-based action at any one of the physical places where "real-world" Starbucks shops exist. Verification system 118 can generate, store, and transmit action verification data, which is data comprising information on one or more users and one or more location-based actions associated with the users.

Location networking system 120a is a network-addressable computing system that can receive, store, and transmit location attribute data, action verification data, and other data associated with location 115 and verification system 118. Location networking system 120a can be accessed by the other components in system 100 either directly or via network 160. In some embodiments, user 101 can physically bring his client system 130 to location 115 (e.g., if client system 130 is a smart phone). Client system 130 may then be able to interact directly with location 115 or verification system 118.

Social networking system 120c is a network-addressable computing system that maintains social graphs. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120c or game networking system 120b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120c managed by a third party (e.g., Facebook, Friendster, MySpace). In yet other embodiments, user 101 has a social network on both game networking system 120b and social networking system 120c, wherein user 101 can have a social network on the game networking system 120b that is a subset, superset, or independent of the player's social network on social networking system 120c. In such combined systems, game networking system 120b can maintain social graph information with edge type attributes that indicate whether a given friend is an "in-game friend," an "out-of-game friend," or both. The various embodiments disclosed herein are operable when the social graph is managed by social networking system 120c, game networking system 120b, or both.

Figure 2:
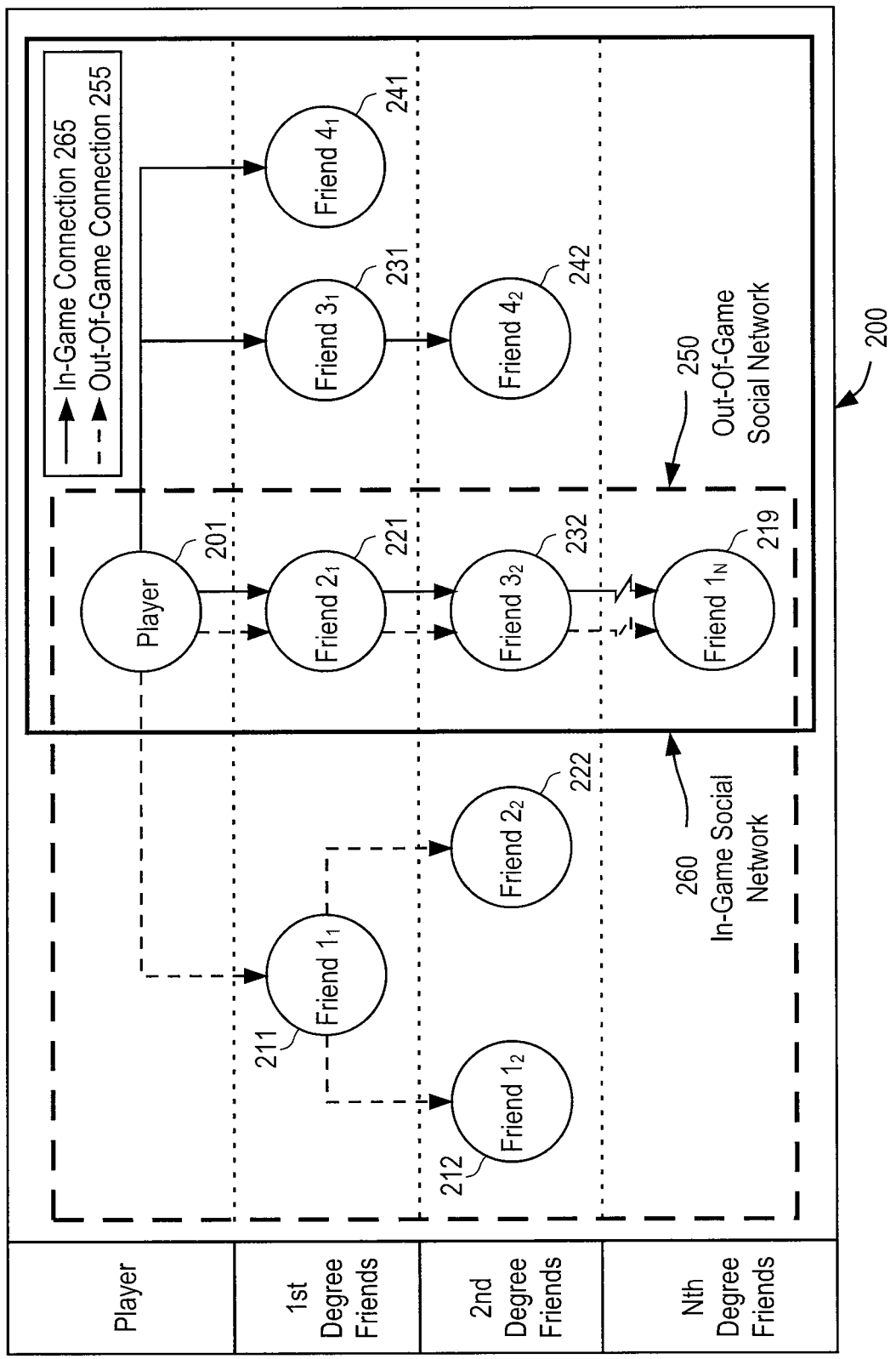
FIG. 2 is a block diagram illustrating an example of a social network within a social graph.

FIG. 2 is a block diagram illustrating an example of a social network 200 within a social graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social network 200.

In various embodiments, Player 201 can have Nth-degree friends connected to him through a chain of intermediary degree friends, as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

The game networking system 120b may determine information related to a social network of a user or an aggregation of the social networks of a user. Such information may include measurements pertaining to the social graphs, such as the size, width, or depth of the social graphs. For example, such information may include how many people are in the social graph, how fast the social graph is growing, or how many branches of a master social graph (e.g., a graph of all Facebook users) are covered in the social graph. Such information may also include a level of participation in a computer-implemented game of the people in the social graph, such as a level of success of the people at completing game-related quests or how much the people have helped others complete game-related quests. A measurement of the value of the social graph may depend on weighted measurements pertaining to information about the people in the social graph. Thus, the game networking system 120b may consider a first social graph to be more valuable than a second social graph based on the members of the first social graph having higher levels of participation in a computer-implemented game than members of the second social graph, even if the second social graph has more members. The game networking system 120b may incorporate measurements pertaining to the social graphs of a user into any of its decisions, such as the size of an incentive reward to offer to a player or a location-based action to propose to a player.

Game Systems

In an online game, a game engine manages the game state of the game. Game state comprises all in-game parameters, including player character state, non-player character (NPC) state, in-game assets and other virtual items, in-game obstacles, game parameters (e.g., internal game clocks, game environments), and other in-game elements or features. Each player controls one or more player characters (PCs). The game engine controls all other aspects of the game, including non-player characters (NPCs), in-game obstacles, and other game elements. The game engine also manages game state, including player character state, for currently active (online) and inactive (offline) players.

A player character can have a set of attributes associated with the player character. As used herein, player character state can refer to one or more in-game attributes of a player character, such as in-game location, assets, levels, condition, health, status, inventory, skill set, name, orientation, am Ration, specialty, and so on. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

In various embodiments, an online game can provide a mechanism for player characters to acquire in-game assets, which are a type of virtual item or thing that provides some type of in-game benefit to a player character. In some embodiments, an in-game asset can provide an in-game benefit for the player character by improving the player character's state. The improved player character state could increase the player character's likelihood or ability to advance in the game, or otherwise improve game play. For example, in-game assets could be character levels, ability points, skill points, hit points, mana points, combat bonuses, and the like. In-game assets can also be virtual representations of real life things such as cash, chattel, precious valuables, personal property, real property, weapons, vehicles, titles, jobs, and the like. In-game assets can also include mythical and fantasy things, such as manna, magical items, potions, relics, artifacts, and the like.

An online game can be hosted by game networking system 120b, which can be accessed using any suitable connection with an appropriate client system 130. A player may have a game account on game networking system 120b, wherein the game account can contain a variety of information associated with the player (e.g., the player's personal information, financial information, purchase history, player character state, and game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player of an online game hosted on game networking system 120b. Game networking system 120b can determine that user 101 is accessing the online game by reading the user 101's cookies, which may be appended to Hypertext Transfer Protocol (HTTP) requests transmitted by client system 130, and/or by the user 101 logging onto the online game.

Locations

As used herein, a location is a specific physical place in the real world. For example, location 115 could be a store, restaurant, mall, business office, building, park, street venue, library, or the like. A location may be a sub-location (e.g., a defined boundary) within a location. For example, a location may be a section within a stadium for a visiting team or a section within a stadium for a home team. A location may be at a public address (e.g., an address of a library) or a private address (e.g., an address of a person's home). A location may be a dynamic or moving location (e.g., inside a tour bus or an airplane). Location 115 can have various systems associated with it, including verification system 118 and location networking system 120a. As used herein, the operator of location 115 is the person or entity that owns, possesses, operates, or otherwise controls location 115. Furthermore, as used herein, a user 101 of location 115 is a person who can enter, visit, use, purchase, or perform some other action at location 115. This can include past, present, and future users of location 115. In various embodiments, a player of an online game may also be a user 101 of location 115.

In various embodiments, location 115 can have one or more devices for communicating with game networking system 120b. Verification system 118 or location networking system 120a can communicate with game networking system 120b, either directly or via network 160. In some embodiments, verification system 118 and location networking system 120a are part of the same computing system.

User Identification

In various embodiments, location networking system 120a can identify users of location 115 by a variety of methods. The methods described below are not intended to be limiting, and one of ordinary skill in the art would recognize that other methods can be used to identify a user 101.

In some embodiments, location networking system 120a can identify a user 101 when the user 101 purchases an item at location 115. When a user 101 purchases an item at location 115, location networking system 120a may collect purchase information from the user 101, including the user 101's name, credit card number, billing address, shipping address, email address, and so forth. For example, if user 101 visits a store and purchases an item with a credit card, location networking system 120a could use the information contained on the credit card to identify user 101.

In some embodiments, location networking system 120a can identify a user 101 based on some form of identification presented by the user 101 at location 115. A user 101 could present a membership card, discount card, coupon, ticket, code, driver's license, passport, or other item that contains identifying information about the user 101 at location 115. For example, user 101 may have a ticket with a scannable code (e.g., a barcode or a Quick Response (QR) code) that contains identifying information. The ticket can be scanned at location 115, thereby allowing location networking system 120a to identify user 101.

In some embodiments, location networking system 120a can identify a user 101 based on the user 101's proximity to location 115. A user 101's proximity can be determined using various devices or applications, such as a GPS device, a social networking site (e.g., Facebook, Twitter), a location tracking site (e.g., Foursquare, Google Latitude), a location reservation site (e.g., OpenTable, Expedia), and the like. Location networking system 120a could then access this proximity information to identify the user 101. For example, if user 101 enters a store, he could access Foursquare via any suitable computing device to indicate that he is at the store, and Foursquare could transmit this information to location networking system 120a (e.g., based on the user 101 opting in to the transmitting of the information), thereby informing location networking system 120a that user 101 is at the store. In another example, location 115 could have a QR code printed inside the location, which user 101 could photograph with a mobile client system 130 (e.g., a smart phone) and transmit to location networking system 120a. In yet another example, if user 101 makes a reservation to dine at a restaurant on a location reservation site, such as OpenTable, location networking system 120a could identify user 101 when he checks in with the maitre d' at the restaurant.

In some embodiments, location networking system 120a can identify a user 101 when the user 101 provides an indication of the user 101's presence at location 115. User 101 could check-in with a host, log in to a computing device, activate a button or switch, or perform some other type of action to indicate the user 101's presence at location 115, which could then be transmitted to location networking system 120a. For example, if user 101 visits a hotel, location networking system 120a could identify user 101 when he checks in with the hotel clerk. In another example, if user 101 accesses a computing system or network at location 115, location networking system 120a could identify user 101 when he logs into the computing system or accesses the network.

In some embodiments, location networking system 120a or game networking system 120b can identify user 101 based on a search engine query made by the user 101. For example, if user 101 queries a search engine (e.g., Google or Yahoo) that has information that identifies user 101, that information can be transmitted to location networking system 120a or game networking system 120b along with any other relevant information (e.g., the search query made by user 101) that either system could use to identify user 101.

In some embodiments, while identifying a user 101, location networking system 120a may also collect information related to one or more game accounts associated with the user 101, including any unique game account identifiers assigned to the user 101. For example, user 101 may gain entrance to location 115 by presenting a ticket with a scannable QR code, which contains information identifying user 101 and information about user 101's unique identifier in an online game. After this ticket is scanned at location 115, the identifying information can be transmitted to location networking system 120a.

In some embodiments, location networking system 120a can assign a unique identifier to each user 101 of location 115. Location networking system 120a can assign a name, identification number, or other unique identifier to user 101. Location networking system 120a can also utilize any unique identifier assigned to the user 101 by game networking system 120b.

Meta Games

Figure 3:
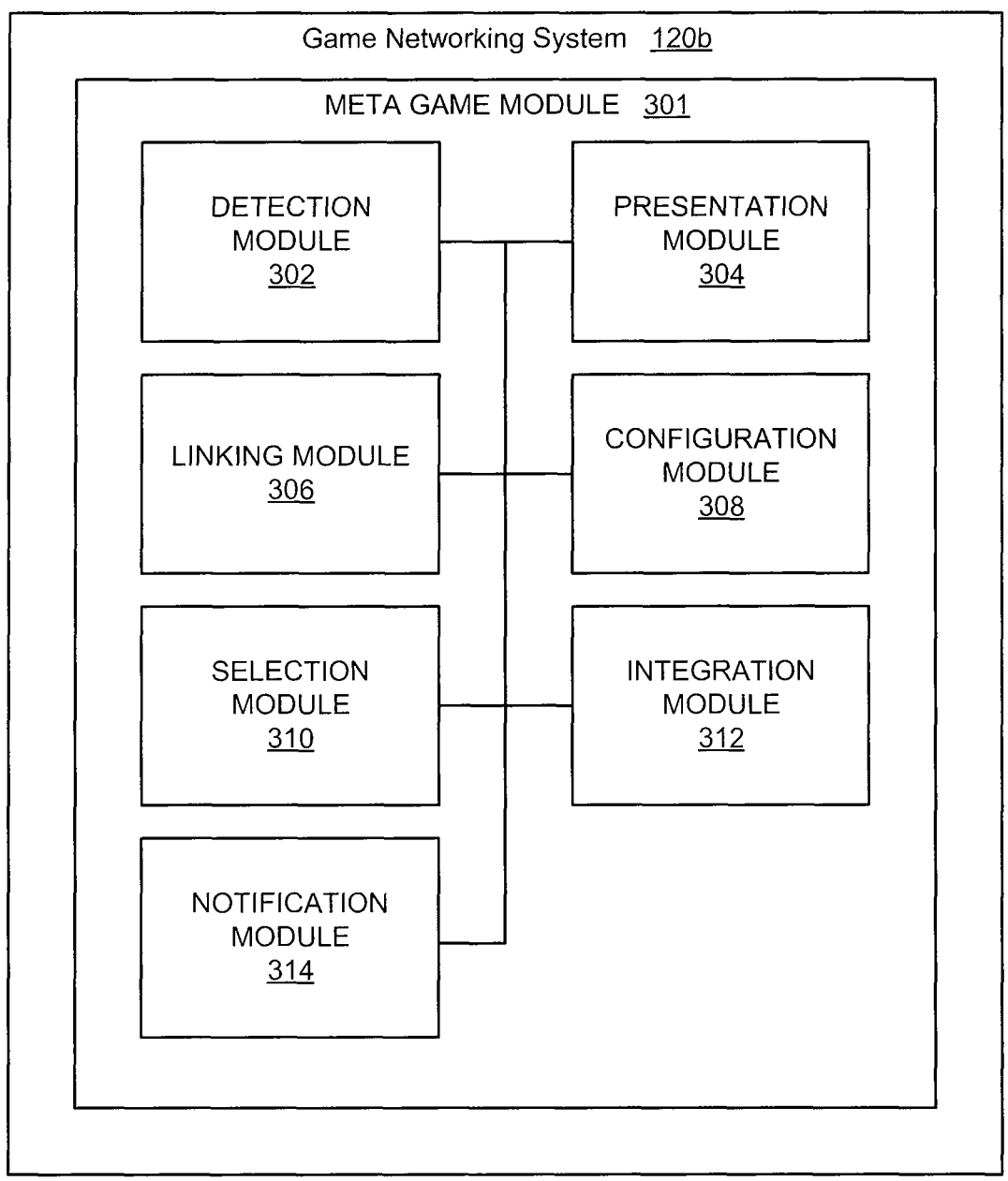
FIG. 3 is a block diagram example modules of a game networking system.

FIG. 3 is a block diagram illustrating example modules of the game networking system 120b. The game networking system 120b includes a meta game module 301 configured to enable a player of a computer-implemented game to participate in a computer-implemented meta game corresponding to the computer-implemented game. A computer-implemented meta game is a game that is played outside of the bounds of (or in a game universe outside of) the computer-implemented game to which the computer-implemented meta game corresponds. Thus, a computer-implemented meta game may be external to the core game play loop of a game or add goals beyond those already presented within the game. An example of a computer-implemented meta game of a computer-implemented game is a location-based leader board for the computer-implemented game (described below). Another example of a computer-implemented meta game of a computer-implemented game is battle game (described below).

The meta game module 301 includes a detection module 302 configured to detect a presence of a device at a location. In various embodiments, the detection module 302 may also detect information about a user of the device, such as information about an action that the user is performing or has performed with respect to a computer-implemented game executing on the device.

The meta game module 301 includes a presentation module 304 to instruct a device to present a player of a computer-implemented game with an option to participate in a computer-implemented meta game associated with a location. The presentation module 304 may present the option based on various factors, such as a linking or association between the computer-implemented meta game and the location, a linking or association between the computer-implemented meta game and the computer-implemented game, a detection of a presence of the user at the location, or a selection of a computer-implemented meta game that is relevant to an action performed by the user within the computer-implemented meta game. For example, based on a detection of the device at a location (e.g., a Starbucks store), and based on a detection that a user of the device is a player of a computer-implemented game that corresponds to a computer-implemented meta game associated with the location, the presentation module 304 may instruct the device to present a user interface (e.g., a pop-up dialog box) offering the user an option to participate in the computer-implemented meta game.

The meta game module 301 includes a linking module 306 configured to link a computer-implemented meta game to a location. For example, the linking module 306 may receive input from an administrator of the computer-implemented meta game (e.g., an administrator of the game networking system 120b, an operator of a location, or a player of a computer-implemented game) establishing an association between a computer-implemented meta game and a location (e.g., via an API of the meta game module 301). The input from the administrator of the computer-implemented meta game may create or define the computer-implemented meta game. For example, the administrator of the computer-implemented meta game may specify rules of the computer-implemented meta game and/or a range of the location to associate with the computer-implemented meta game (e.g., a particular address, a city, or a state; a collection of locations of the same type, such as Starbucks locations, shopping malls, or airports; and so on).

Additionally, the linking module 306 may link a computer-implemented meta game to a computer-implemented game. For example, the linking module 306 may receive input from an administrator of the computer-implemented meta game establishing an association between a computer-implemented game and a computer-implemented meta game (e.g., via an API of the meta game module 301). The input from the administrator of the computer-implemented meta game may identify which actions performed by a player of a computer-implemented game are relevant to the computer-implemented meta game. Furthermore, the administrator of the computer-implemented meta game may define how actions performed by a player of a computer-implemented game are reflected in the computer-implemented meta game.

The meta game module 301 includes a configuration module 308 configured to enable an administrator of a computer-implemented meta game to configure the computer-implemented meta game. For example, the meta game module 301 may receive input from an administrator of a computer-implemented meta game that specifies values for configurable attributes of the computer-implemented meta game. Such configurable attributes may include any of the values specified by the administrator of the computer-implemented meta game when linking the computer-implemented meta game to a computer-implemented game or a location. For example, a configurable attribute may be a range of the location associated with the computer-implemented meta game (e.g., a local house or establishment, city, or state) or a length (or permanence) of the computer-implemented meta game (e.g., whether the computer-implemented meta game is a permanent game or a temporary game, such as a daily; weekly, monthly, or yearly game).

The meta game module 301 includes a selection module 310 configured to select a computer-implemented meta game from a plurality of computer-implemented meta games. The presentation module 304 may present a player with an option to participate in the computer-implemented meta game based on this selection. This selection of the computer-implemented meta game may be based on various criteria, such as a determination of a relevancy of the computer-implemented meta game to the player of the computer-implemented game. The determination of the relevancy may be based on data received from the user, such as preference data pertaining to computer-implemented meta games. Such preference data may include types of games that the player prefers, ranges of locations that the player prefers, durations of games that the player prefers, levels of permanence of games that the player prefers, and so on.

The meta game module 301 includes an integration module 312 configured to integrate information pertaining to a location into a computer-implemented meta game. For example, the integration module 312 may determine a visual theme or a branding message associated with the location. For example, an administrator of the computer-implemented game may provide a logo corresponding to the location as input. The integration module 312 may then integrate the logo into messages presented to the user, such as a message notifying the user of the option to participate in a computer-implemented meta game. Or the integration module 312 may determine particular buzz words or other attributes associated with a location or a marketing campaign associated with the location. Then, the integration module 312 may incorporate the attributes into a user interface element (e.g., a pop-up dialog box) of the computer-implemented meta game.

The meta game module 301 includes a notification module 314 configured to notify a player of information pertaining to a computer-implemented meta game. For example, the notification module 314 may notify the player of an incentive (e.g., a coupon or discount) that an operator of a location will offer to the player based on the player participating in a computer-implemented meta game associated with the location. The notification module 314 may also notify the user of the status of the computer-implemented meta game, such as results of actions that other players of the computer-implemented meta game have performed with respect to the computer-implemented meta game.

Figure 4:
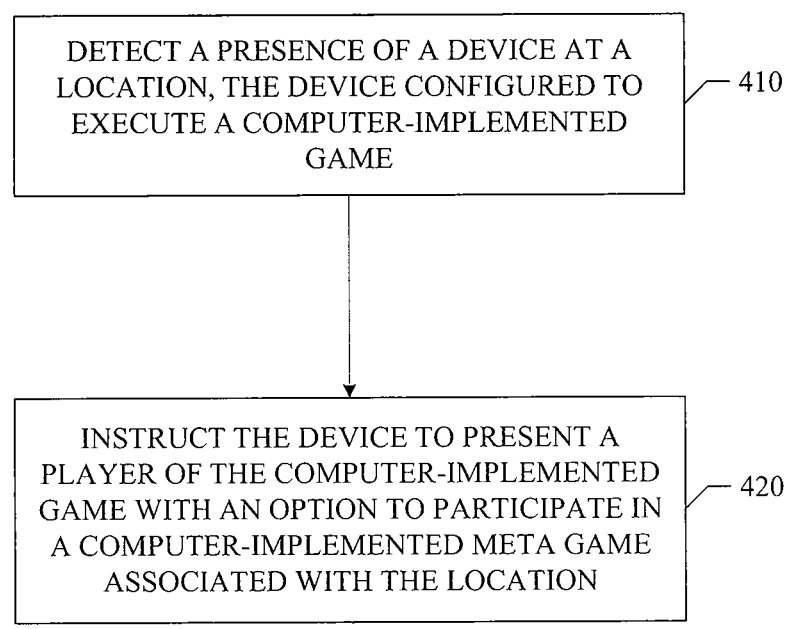
FIG. 4 is a flowchart illustrating an example method of presenting a player of a computer-implemented game with an option to participate in a computer-implemented meta game.

FIG. 4 is a flowchart illustrating an example method 400 of presenting a player of a computer-implemented game with an option to participate in a computer-implemented meta game. At operation 410, the detection module 302 detects a presence of the client system 130 at the location 115. For example, the detection module 302 detects (e.g., via the location networking system 120a) that an Apple iPhone device is located at particular GPS coordinates corresponding to a Starbucks coffee shop.

At operation 420, the presentation module 304 instructs the device to present a player of the computer-implemented game with an option to participate in a computer-implemented meta game associated with the location. For example, the presentation module 304 calls an API of the client system 130 or an API of an application executing on the client system 130 to present a pop-up message to the player, asking the player whether he wishes to participate in the computer-implemented meta game. If the player chooses to participate in the computer-implemented meta game, the linking module 306 may link the computer-implemented game to the computer-implemented meta game such that results of actions that the player performs within the computer-implemented game are reflected in the computer-implemented meta game. For example, if a player chooses to participate in a leader board associated with a location, the linking module 306 may update the leader board for that location whenever the player is present at the location and achieves a result within the computer-implemented game that qualifies for inclusion on the leader board.

Figure 5:
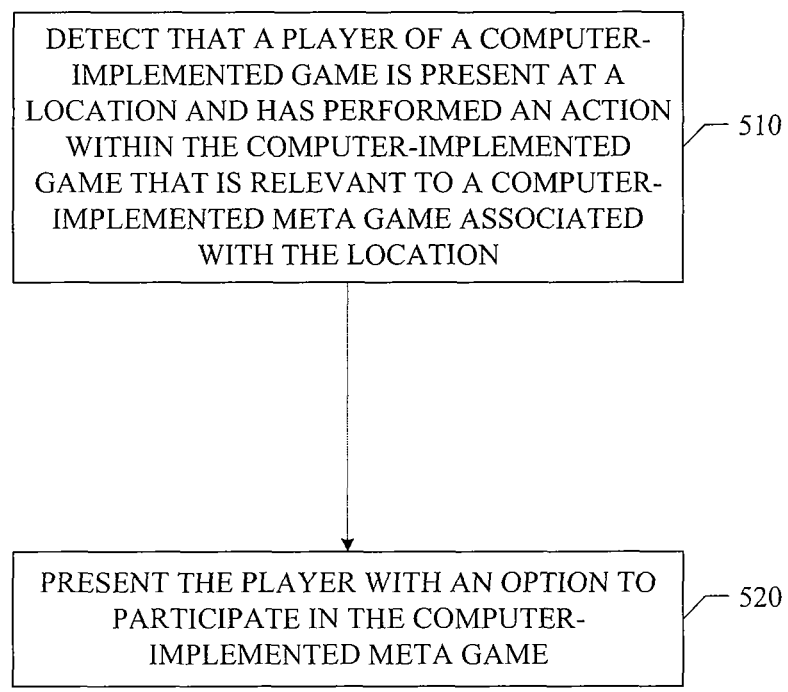
FIG. 5 is a flowchart illustrating an example method of presenting a player of a computer-implemented game with an option to participate in a computer-implemented meta game.

FIG. 5 is a flowchart illustrating an example method 500 of presenting a player of a computer-implemented game with an option to participate in a computer-implemented meta game. At operation 510, the detection module 302 detects that a player of a computer-implemented game is present at a location. Additionally, the detection module 302 detects that the player of the computer-implemented game has performed an action or achieved a result within the computer-implemented game that is relevant to a computer-implemented meta game associated with the location. For example, if the player is playing a word game (e.g., Zynga's Words With Friends), and the player plays a word (e.g., "SPLENDID") for a score of 44 points, the detection module 302 may determine that the player's result is relevant to a leader meta game associated with the word game and the location (e.g., based on the player's score of 44 points being higher than a score of an additional player participating in the computer-implemented meta game).

At operation 520, the presentation module 304 presents the player with an option to participate in the computer-implemented meta game. The presenting of the option may be based on the detection module 302 detecting that the player is present at the location and has performed an action or achieved a result that is relevant to the computer-implemented meta game (see operation 510). The process of presenting the player with the option may be similar to the process described with respect to operation 420 of FIG. 4.

Leader Board Meta Game

Figure 6:
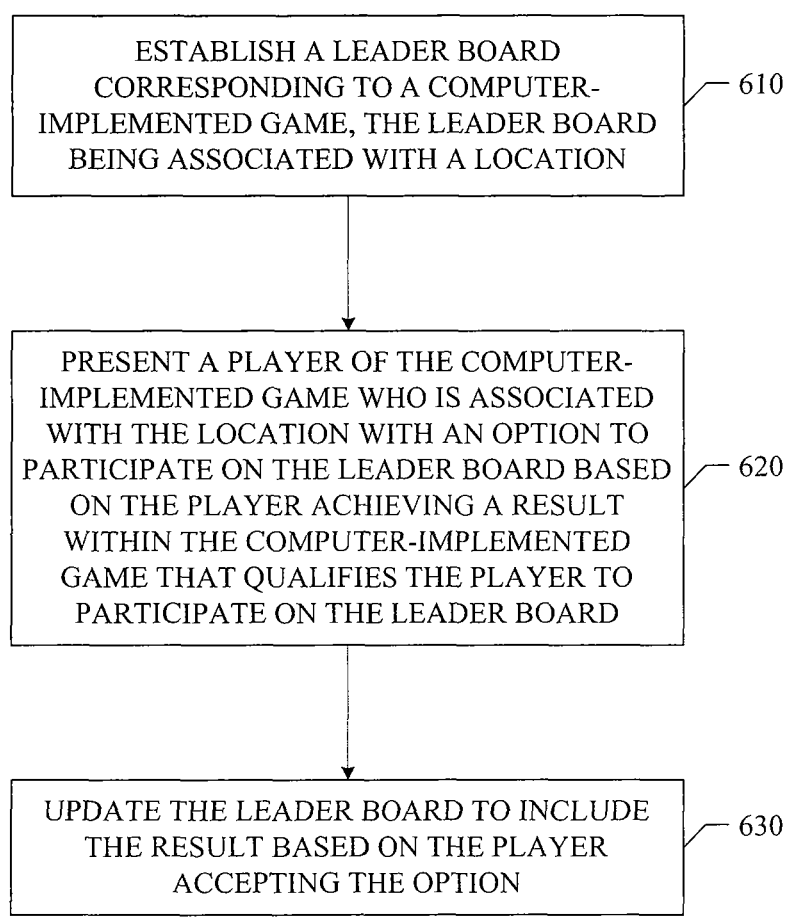
FIG. 6 is a flowchart illustrating an example method of presenting a player of a computer-implemented game with an option to participate in a computer-implemented meta game embodied as a leader board associated with a location.

FIG. 6 is a flowchart illustrating an example method 600 of presenting a player of a computer-implemented game with an option to participate in a computer-implemented meta game embodied as a leader board associated with a location. This local leader board may encourage a player to play a game whenever the player finds himself at a new location or revisiting a favorite location (e.g., the player's local Starbucks). At operation 610, the linking module 306 establishes a leader board (e.g., based on input from an administrator of the leader board, such as an administrator of the game networking system 120b, an operator of a location, or a player). The linking module 306 may also associate the leader board with one or more computer-implemented games. For example, the leader board may pertain to a particular number of the top results of actions of players with respect to one game, such as the top 10 scores for playing a word in Zynga's Words With Friends. Or the linking module 306 may associate the leader board with multiple computer-implemented games. For example, the leader board may pertain to results of actions of players having a cross-game slant, such as a number of games (of different types) won on a particular gaming network, such as the Zynga game network or the Zynga's Words With Friends network, or a combination of scores from multiple games.

At operation 620, the presentation module 304 presents the player of the computer-implemented game with an option to participate on the leader board based on the player achieving a result (or being close to achieving a result) within the computer-implemented game (e.g., while being present at the location or otherwise associated with the location) that qualifies the player to participate on the leader board. For example, if the player plays a word (e.g., "SPLENDID") for a score of 44 points within the computer-implemented game, and the score of the lowest-ranked player on the leader board is less than 44 points, the presentation module 304 may present the player with the option to participate on the leader board based on the result of the player's action being a score that exceeds the score of the lowest-ranked player on the leader board. By notifying a player is close to achieving a result that qualifies the player to participate on the leader board, the presentation module 304 may incentivize the player to increase his participation in the computer-implemented game at the location.

At operation 630, the integration module 312 updates the leader board to include the result based on the player accepting the option to participate on the leader board. For example, the integration module 312 adds the score of the word played and the name of the player who played the word to the leader board.

The configuration module 308 may create, configure, or maintain multiple versions of a leader board, thus providing a player with a better chance of achieving a result within the computer-implemented game that qualifies the player to participate on the leader board. For example, the configuration module 308 may establish leader boards having different levels of permanence (e.g., a daily, weekly, monthly, yearly, or "best ever" leader boards corresponding to high scores achieved by players within the computer-implemented game at the location). Or the configuration module 308 may establish leader boards having different ranges (e.g., city, state, region, nation) or different levels of abstraction (e.g., all Starbucks locations instead of a particular Starbucks location, or all gyms instead of a specific gym).

The configuration module 308 may create, configure, or maintain leader boards having different scoring mechanisms. For example, the configuration module 308 may create a leader board for comparing a combined score of users at a first location versus a combined score of users at a second location or a highest score of all the users at a first location versus a highest score of all of the users at a second location. In this way, the leader board may enable a player to feel like he is contributing to the success of "his Starbucks" or "his gym." Locations may be ranked against similar locations. By contributing to the success of a location relative to another location, a player may qualify to receive a reward (e.g., a coupon for a free coffee from an operator of a coffee shop). Such rewards may be integrated into the computer-implemented meta game from information pertaining to an advertising campaign associated with the location, as described in more detail with respect to FIG. 9.

The configuration module 308 may create, configure, or maintain leader boards based on input from an administrator of the leader board. The administrator may be a player of a computer-implemented game associated with the leader board, an administrator of the game networking system 120b, or an operator of a location. For example, the administrator of a computer-implemented meta game may provide a specification of the computer-implemented meta game to the configuration module 308, as described in more detail with respect to FIG. 8. For example, a player of a computer-implemented game may create a leader board for players of a computer-implemented game who attends his Super Bowl party. Or a player may create a leader board for people present at a particular event, such as a concert or a sporting event, or for a subset of the people present at the particular event (e.g., players in box seats at a game or backstage at a concert). The presentation module 304 may restrict access to the leader board to players who attend the event (e.g., via a login or password mechanism).

The configuration module 308 may enable an operator who represents an official entity (e.g., the National Football League) to establish an "official" leader board. The official leader board may be a temporary leader board that tracks achievements of players with respect to a computer-implemented game during an event sponsored by the entity, such as the Super Bowl. The integration module 312 may integrate the achievements into a broadcast associated with the event (e.g., high scores achieved within the computer-implemented game may be integrated into a ticker of a television broadcast associated with the game).

The notification module 314 may post messages on the social networking system 120c to notify the players or friends of the players of achievements of the players with respect to the leader board, thus increasing the visibility and viral nature of the computer-implemented game or computer-implemented meta game.

Battle Meta Game

Figure 7:
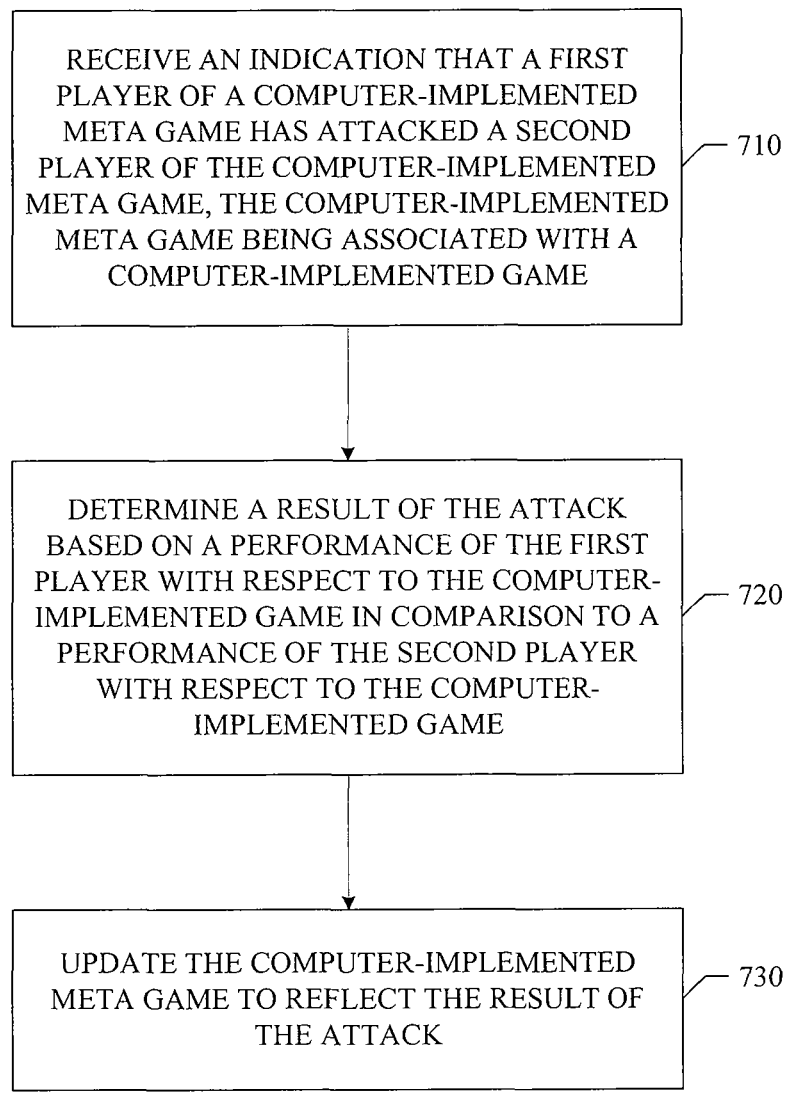
FIG. 7 is a flowchart illustrating an example method of implementing a computer-implemented meta game embodied as a battle meta game.

FIG. 7 is a flowchart illustrating an example method 700 of implementing a computer-implemented meta game embodied as a battle meta game. The battle meta game may be a battle game that enables players to attack other players or defend against attacks from other players based on results of actions performed by the player and the other players in a computer-implemented game that is linked to the battle meta game.

For example, upon choosing to participate in the battle game, a player may indicate a location with which he is associated (e.g., his current physical location). The location with which a player is associated may be a general location (e.g., a neighborhood, city, state, or zip code) or a specific location (e.g., an address or GPS coordinates). The battle game may treat the location with which a player is associated as the base of that player's operations with respect to the battle game. In various embodiments, players of the battle game may be able to change the location with which they are associated. In this case, a player may be restricted from simply switching his location in order to join a winning side of a battle or game before the battle or game is over.

Each player may participate in the battle game as an individual or as part of an alliance. For example, a player may join an alliance of players who are associated with a same location as the player (e.g., at the city, state, regional, or national level). In various embodiments, the alliances that a player can join may be restricted based on the player's location. For example, a player who is associated with Texas may be able to join alliances associated with Texas or a Southern region of the U.S., but not alliances associated with other states or regions. The player may have an option to create an alliance or join any of the alliances for which he is eligible (e.g., the alliance that is most popular or visible with respect to the player's location).

Alliances may be public or private. Private alliances may function in a similar way to "guilds" associated with a multiplayer massively online (MMO) game. For example, private alliances may be created organically by players inviting or recruiting friends or acquaintances. Public alliances may be created automatically by the battle game (e.g., based on the locations with which players of the game are associated) or by an administrator of the battle game. Public alliances may be available to be joined by any player who meets requirements of the alliance (e.g., having a home base in Texas, a Southern region of the United States, etc.) A new player may be automatically assigned to a beginning alliance (e.g., based on the player being associated with a particular geographic location). In various embodiments, the location with which a player is associated may be fixed to the player (e.g., such that the player cannot change his location while playing the game). In various embodiments, a player may be assigned to an alliance temporarily based on the player being at a location temporarily. For example, a player who is associated with Texas, but who is visiting New York temporarily, may be limited to joining a New York alliance until that player returns to Texas.

An alliance may be represented as battle ships. For example, a player may be presented with a number (e.g., five) battle ship slots to fill. The player may then recruit his friends (e.g., in-game or out-of-game friends) to fill the battle ship slots.

Players of the battle game or alliances of players of the battle game may attack other players or other alliances of the battle game. The attacks may be used to acquire territory, virtual items, points, or other aspects of the battle game in order to win the battle game based on the rules of the battle game. For example, a battle game may enable a player to attack another player in order capture a location on a virtual map of the battle game that corresponds to the location with which the other player is associated. As another example, if a player from a first location beats a player from a second location, then the first player may "capture" the second location or maintain a stronghold in the second location. The goal of the battle game may be to capture as much of the territory of the virtual map as possible (e.g., before a time period expires, a number of rounds have been played, or a result has been achieved, such as the capturing of some or all of the territories on the virtual map).

In various embodiments, players may be gated in the ways that they can attack and control territories. For example, players may initially only be able to attack areas bordering territories they control. Thus, a player controlling territory in Texas may only being able to attack players controlling territories in bordering states, such as Oklahoma, Arkansas, Louisiana, and New Mexico. The attack paths available to the player may also be divided by population or other factors, such as districts. Thus, players associated with the eastern district of Arkansas may only be able attack players associated with the western district of Arkansas, northern district of Texas, and so on.

As a player or alliance captures territories, the player or alliance may have the option to pursue additional attack routes. For example, if players from Texas defeat players from Oklahoma, thus capturing an Oklahoma territory, the players from Texas may then be able to attack players in states bordering Oklahoma, such as Colorado, Kansas, and Missouri.

A player may be able to draw upon additional networks (e.g., social networks) for increased protection or attack power. For example, a Texas-network-allied player may leverage his personal network (say, of international lawyers) to contribute to his defense from an invading alliance or other external network. The battle game may add a social network wrapper to this experience to increase the visibility or viral nature of the battle game. For example, the battle game may post messages on the social networking system 120c (e.g., on the walls of players or friends of players needing assistance within the battle game).

In an example scenario, Player A, who is in the Texas Alliance, is attacked by Player B, who is in the Oklahoma Alliance. Player C is in the New York Alliance, but is a friend of Player A. Player A posts on the social networking system 120c that he is under attack. Player C sees the post and clicks a link embedded in the post to attack Player B. Even if Player A is defeated by Player B, if Player C successfully intervenes (e.g., by defeating Player B), Player A may be defended (e.g., not suffer a loss to Player B). Thus, connecting players through the social networking system 120c may enable a player to participate in the attacking or defending of players (e.g., friends of the player) that the player would not normally be able to attack or defend.

The results of actions performed with respect to the battle game may be reflected on a location-based leader board, such as the leader board described above with respect to FIG. 6. For example, moves made and actions taken with respect to the battle game may be associated with the location associated with the players performing the moves. High-scoring moves may be posted to local leader boards or contribute to a score associated with a location.

At operation 710, the detection module 302 detects that a first player of a computer-implemented meta game has attacked a second player of the computer-implemented meta game. For example, the detection module 302 receives an indication from the first player that he is attacking the second player. The computer-implemented meta game is associated with a computer-implemented game such that the result of the attack will he determined by actions performed by the first player and the second player within the computer-implemented game.

At operation 720, the linking module 306 determines a result of the attack based on a performance of the first player with respect to the computer-implemented game in comparison to a performance of the second player with respect to the computer-implemented game. For example, if the computer-implemented game is a word game, such as Zynga's Words With Friends, the result of the attack may be based on whether the first player or the second player plays a higher scoring word before a time period expires.

At operation 730, the linking module 306 updates the computer-implemented meta game to reflect the result of the attack. For example, if the computer-implemented meta game involves a dispute over virtual territory, the linking module 306 may reflect the result of the attack by changing an ownership of some of the virtual territory. Thus, if the first player wins the attack, the first player may take control over virtual territory in the computer-implemented meta game that was previously controlled by the second player.

Figure 8:
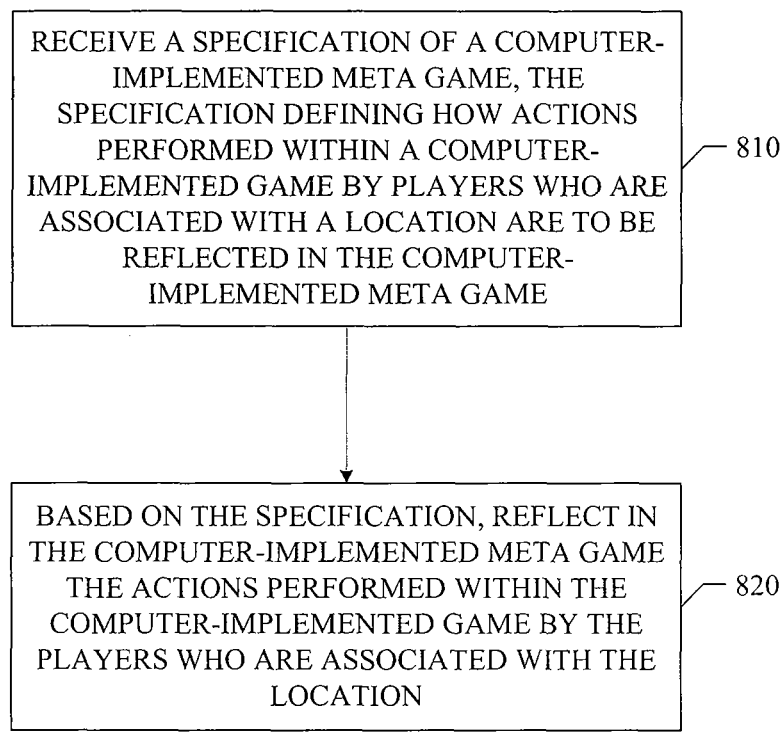
FIG. 8 is a flowchart illustrating an example method of reflecting in a computer-implemented meta game actions performed by players with respect to a computer-implemented game.

FIG. 8 is a flowchart illustrating an example method 800 of reflecting in a computer-implemented meta game actions performed by players with respect to a computer-implemented game. At operation 810, the linking module 306 receives a specification of a computer-implemented meta game. For example, the linking module 306 receives a specification of a computer-implemented meta game from an administrator of the computer-implemented meta game. The administrator may be an administrator of the game networking system 120b, an operator of a location, or a player of a computer-implemented game.

The specification defines how actions performed by players within a computer-implemented game are reflected in the computer-implemented meta game. For example, in the case of a battle meta game, such as the battle meta game described with respect to FIG. 7, the specification may define actions that a player may perform with respect to the meta game (e.g., attack territory, defend territory, join alliance, and so on). The specification may also define how such actions are resolved based on a computer-implemented game that is associated with the computer-implemented meta game. For example, the specification may specify that when a first player attacks a player with respect to the computer-implemented meta game, the winner of the attack is determined based on which player plays the highest-scoring word in the computer-implemented game before a time period expires. Additionally, the specification may define how the result of an action effects the computer-implemented meta game. For example, the specification may specify that, if a first player wins an attack against a second player, the first player gains control of a virtual territory that was previously controlled by the second player with respect to the computer-implemented meta game.

The specification may further specify the rules of the meta game, such as rules governing which players or alliances can attack which other players and alliances, the conditions for winning the game (e.g., that one alliance controls all of the virtual territory or the most virtual territory upon an expiration of a time period), and so on. The specification may specify how a player's association with a particular location (e.g., based on their current GPS coordinates) is to be incorporated into the meta game. For example, the specification may specify that a player at a first location may only attack a player at a second location if the players control bordering territories with respect to the computer-implemented meta game.

At operation 820, based on the specification, the linking module 306 reflects in the computer-implemented meta game the actions performed within the computer-implemented game by the players. For example, if a first player wins an attack against a second player (e.g., if the first player achieves a result in the computer-implemented game that surpasses a result in the computer-implemented game by the second player), the linking module 306 may update a virtual map of the computer-implemented meta game to indicate that the first player has gained control of a territory that was previously controlled by the second player.

Figure 9:
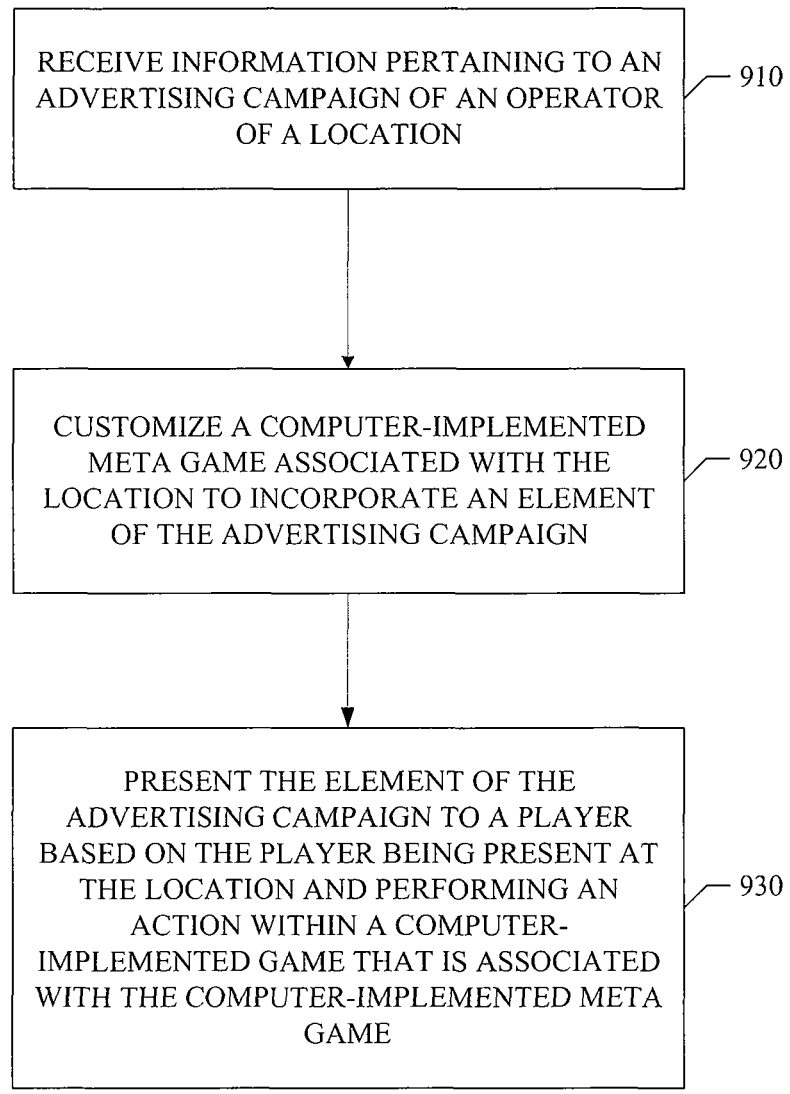
FIG. 9 is a flowchart illustrating an example method of incorporating elements of an advertising campaign associated with a location into a computer-implemented meta game associated with the location.

FIG. 9 is a flowchart illustrating an example method 900 of incorporating elements of an advertising campaign associated with a location into a computer-implemented meta game associated with the location. At operation 910, the integration module 312 receives information pertaining to an advertising campaign associated with a location. For example, the integration module 312 receives a logo, a branding message, buzz words, or an incentive pertaining to the advertising campaign (e.g., from an operator of the location).

At operation 920, the integration module 312 customizes a computer-implemented meta game associated with the location to incorporate an element of the advertising campaign. For example, the integration module 312 incorporates an incentive received from an operator of the location into a message that is to be communicated to a player of a computer-implemented meta game associated with the location.

At operation 930, the presentation module 304 presents the element of the advertising campaign to a player based on the player being present at the location and performing an action within the computer-implemented game that is associated with the computer-implemented meta game. For example, if a player is present at McDonald's, and the integration module 312 has received information pertaining to an incentive offered at McDonald's that is to be offered to a player for participating in a meta game at McDonald's, the presentation module 304 may present the information to the player. As an example, an operator of a McDonald's franchise may offer a player free French fries based on the player contributing to a total score achieved by all players of the meta game at the location of the McDonald's franchise that exceeds a total score achieved by all players of the meta game at a competing location (e.g., a Burger King franchise).

The integration module 312 may integrate such advertising methods into battle games, such as the battle game described above with respect to FIG. 7. For example, a public alliance may be formed by a franchise chain. The members of the alliance may come from "fans" of that franchise on the social network system 120c. For these types of alliances, franchises may offer coupons or may be able to target advertising to those fans. Franchises may host contests in which when members of that franchise's alliance capture certain territories of "enemy" franchises, its members receive coupons or discounts. Attempting to qualify for such incentives may enable players to, in effect, participate in a meta-game within a meta-game. Virtual maps corresponding to the meta game may be populated or filtered by type; food-specific, clothing-specific, or educational institution-specific maps could be created and tailored to foodies, shopaholics, or students. These virtual maps may be sub-maps that are derived or filtered down from a more general map that includes substantially all locations. A player may filter the general map into sub-maps based on his own tastes or interests.

The integration module 312 may update virtual maps associated with a meta game based on alliances or franchises with which a player is associated. The virtual maps corresponding to the meta game may be overlaid over real maps (e.g., maps provided by the location networking system 120a). For example, the integration module 312 may highlight places on a virtual map to highlight a real-world location where a coupon is available, a particularly active area (e.g., where many players are submitting moves), or high areas of activity in terms of ranking changes (e.g., where many battles have been completed).

Figure 10:
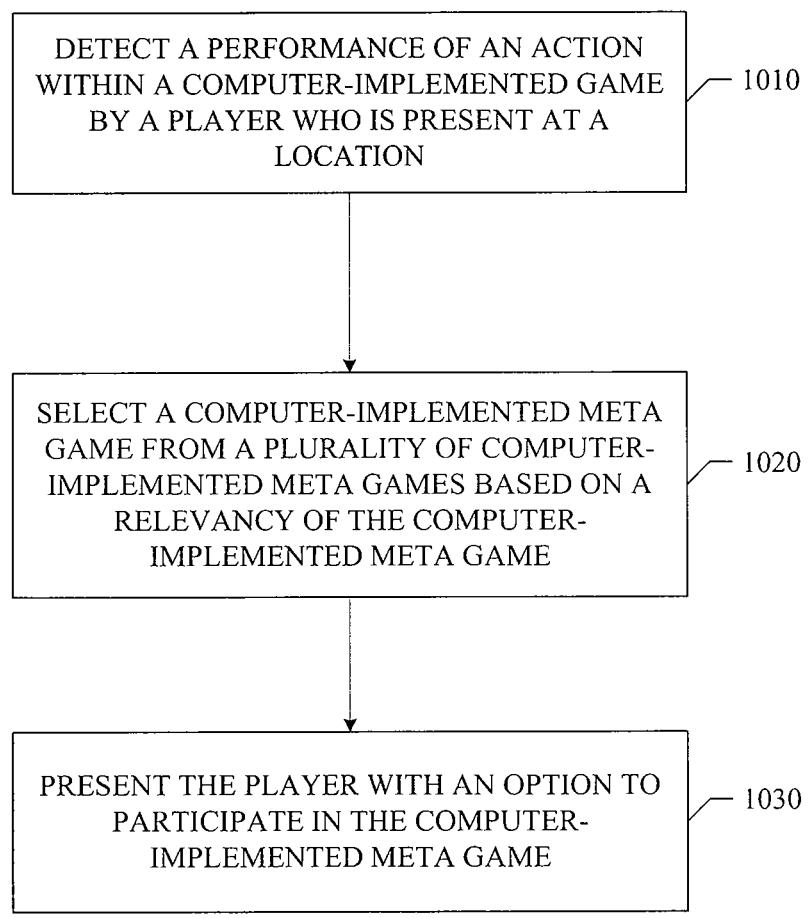
FIG. 10 is a flowchart illustrating an example method of presenting a player with an option to participate in a computer-implemented meta game selected from a plurality of computer-implemented meta games.

FIG. 10 is a flowchart illustrating an example method 1000 of presenting a player with an option to participate in a computer-implemented meta game selected from a plurality of computer-implemented meta games. At operation 1010, the detection module 302 detects a result of a performance of an action within a computer-implemented game by a player who is present at a location. For example, the detection module 302 detects that a player has played a word having a particular score in the Zynga's Words With Friends game. At operation 1020, the selection module 310 selects a computer-implemented meta game from a plurality of computer-implemented meta games based on a relevancy of the computer-implemented meta game.

The relevancy of the computer-implemented meta game may be based on a relevancy of the computer-implemented meta game to interests or preferences of the player, a relevancy of the computer-implemented meta game to a result of the action performed by the player, a relevancy of the computer implemented meta game to a location, and so on. For example, if a result of the action of the player in the computer-implemented game would be more helpful to an alliance of players in a battle meta game than to an alliance of players on a leader board meta game, the linking module 306 may select the battle meta game as the most relevant meta game. Or, if the result of the action of the player in the computer implemented game would be more helpful to an alliance of players of a computer-implemented meta game that is associated with a neighborhood than to an alliance of players of a computer-implemented meta game that is associated with a city or state, the linking module 306 may select the computer-implemented meta game that is associated with the neighborhood as the most relevant meta game.

At operation 1030, the presentation module 302 presents the player with an option to participate in the selected meta game.

As described in the above examples, a player may play a computer-implemented game as normal. However, there may be a location-aware meta-game that the player could participate in simply by playing the computer-implemented game that he already knows and loves. The meta game may exist as an entirely different game running in the background of a normal play session of the computer-implemented game. If the player has no interest in participating in the meta-game, the player can simply play his current games normally, declining any future meta-game updates. In this case, his scores may not be factored into the meta-game.

The presentation module 304 may surface available meta games to a player (e.g., based on a relevance of the meta game, as described above with respect to FIG. 10). For example, information about available meta games may be presented to a user of a client system via a user interface (e.g., a menu) by which the player accesses a computer-implemented game. Additionally, the notification module 314 may notify the player or friends of the player of actions of players with respect to available meta games (e.g., via posting on the social networking system 120*c*).

The notification module 314 may also enable a player to access information pertaining to available meta games. For example, a player may be able to view statistics pertaining to a leader board meta game at a location. A leader board for a word game may include information pertaining to the highest-scoring word ever played, a list of personal achievements (e.g., win-loss records) of players, or a location at which players are most active within a computer-implemented game.

An advantage of providing the meta-game is that player may think about making a move at any new location they visit, thereby contributing to that location's individual, group, franchise, or store ranking. The player may also inspect and compete on any available meta games, taking advantage of any incentivized offers put forth by partnering franchises. Players engaged at this level may be encouraged to play computer-implemented games more often.

Data Flow

Figure 11:
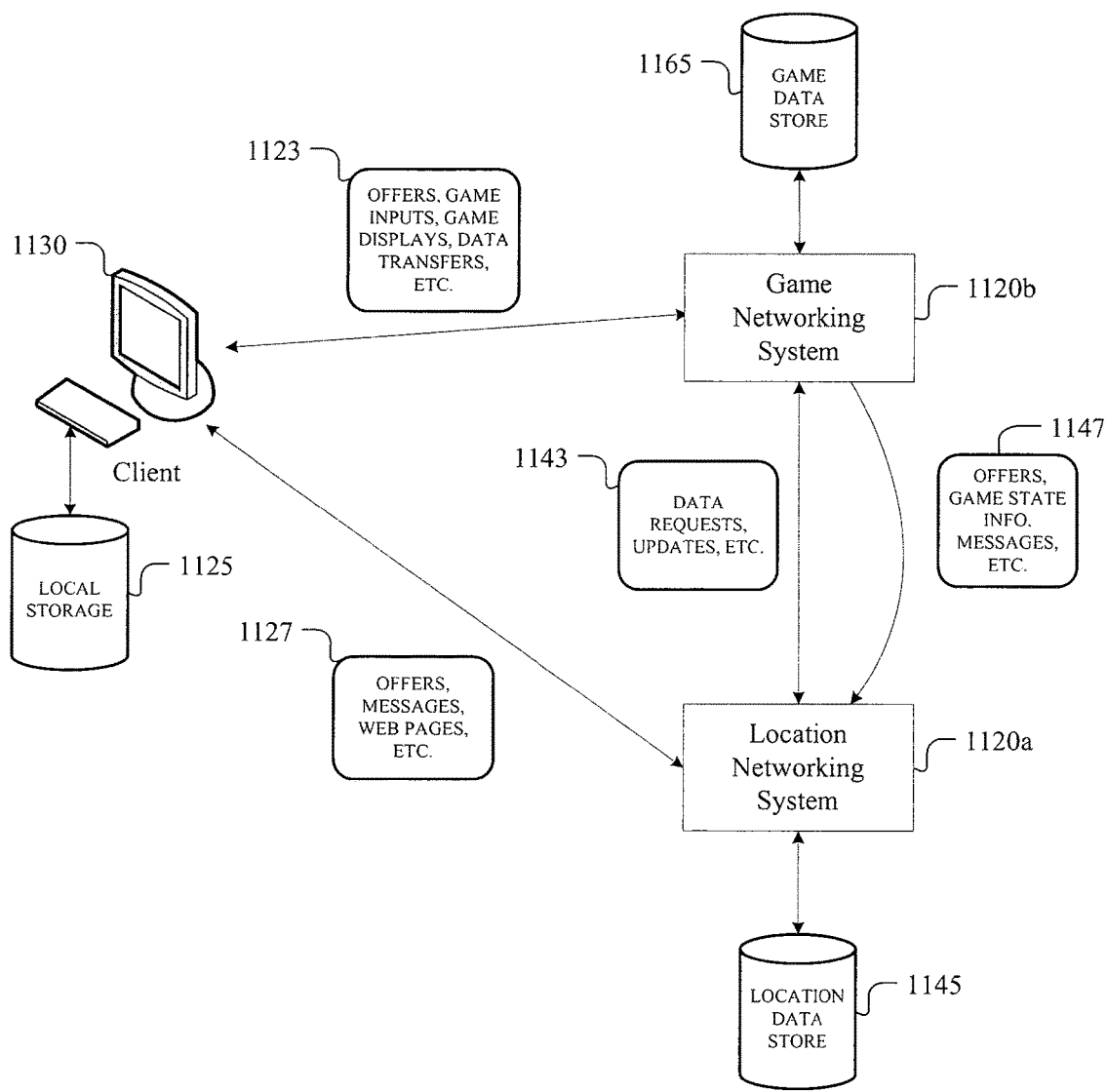
FIG. 11 depicts a schematic of system and data flow between systems in various example embodiments.

FIG. 11 depicts a schematic of system 1100 and data flow between the components of system 1100. System 1100 can include client system 1130, location networking system 1120*a*, and game networking system 1120*b*. Client system 1130, location networking system 1120*a*, and game networking system 1120*b* can each have a corresponding data store such as local storage medium 1125, location data storage medium 1145, and game data storage medium 1165, respectively. Client system 1130 can communicate with location networking system 1120*a* to receive messages, location information, and the like. Additionally, client system 1130 can transmit data to and receive data 1123 (e.g., game inputs, incentive offer information, data transfers) from game networking system 1120*b*. In a similar fashion, game networking system 1120*b* and location networking system 1120*a* can communicate HTTP packets 1143 including data requests, transaction information, updates, and the like. At some other time, or at the same time, game networking system 1120*b* can communicate data 1147 (e.g., game state information, game system account information, page info, messages, and so on) with location networking system 1120*a*. Additionally, client system 1130 can transmit data offers, messages, web pages, and so on) 1127 to and receive data 1127 from game networking system 1120*b*.

Communication between client system 1130, location networking system 1120*a*, and game networking system 1120*b* can occur over any appropriate electronic communication medium or network using any suitable communications protocols. For example, client system 1130, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher-layer communications protocols, including client-server (or request-response) protocols, such as the HyperText Transfer Protocol (HTTP) and other communications protocols, such as HTTP-S, FTP, SNMP, and TELNET. In addition, a server in one interaction context may be a client in another interaction context. Still further, in particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In one embodiment, for example, a client request may cause a server to respond with a first data object, such as an HTML page, which itself refers to other data objects. A client application, such as a browser, will request these additional data objects as it parses or otherwise processes the first data object.

The example data flows in this section are presented with respect to data flow between location networking system 1120*a* and game networking system 1120*b*. One skilled in the art would appreciate that these are presented merely as an example of a data flow between two types of online systems. However, the present disclosure is intended to encompass data flows between a game networking system and a variety of other online systems, such as online merchant systems, online media systems, online reviewing systems, online search engines, and online advertising systems. The example data flows described herein function analogously with these online systems as with location networking systems.

In various embodiments, location networking system 1120*a* or game networking system 1120*b* can receive messages identifying a user 101 (shown in FIG. 1). For example, game networking system 1120*b* can receive a digital message through a network, wherein the message contains information about the identity of the user 101. This message can be sent using any suitable communications protocol.

In one embodiment, messages with identifying information received by location networking system 1120*a* or game networking system 1120*b* will have been sent from the user 101. For example, the user 101 could actively use a digital communication device (e.g., a computer or a smart phone) to send a message to game networking system 1120*b*. In another example, the user 101 could passively use a digital communication device (e.g., a computer or smart phone) to send a message to game networking system 1120*b* by instructing the digital communication device to send a message to game networking system 1120*b* if the device comes within a specified proximity of location 115 (FIG. 1). The user 101's proximity can be determined by a variety of methods (e.g., through the use of a Global Positioning System (GPS)).

In another embodiment, messages with identifying information received by game networking system 1120*b* will have been sent from location 115 or location networking system 1120*a*. For example, location 115 could use a computing system to send a message to game networking system 1120*b*.

In various embodiments, user 101 can receive messages identifying both a location-based action and an offer for an incentive reward. For example, user 101 could receive from game networking system 1120*b* a message describing a location-based action and an incentive reward through client system 1130. In another example, user 101 could receive a similar message from location networking system 1120*a*. In another example, user 101 could receive a message directly from location 115 (e.g., through the use of a physical receipt or through the use of a computer at the location 115).

In various embodiments, location networking system 1120*a* or game networking system 1120*b* can receive a message verifying that user 101 performed a proposed location-based action. For example, game networking system 1120*b* can receive the message in a digital form transmitted over a network. In some embodiments, the message verifying that user 101 performed a location-based action could have been transmitted by location 115 or location networking system 1120*a* to game networking system 1120*b* through the use of verification system 118.

In various embodiments, location networking system 1120*a* or game networking system 1120*b* can verify the presence of user 101 relative to location 115. For example, the user 101 could directly inform game networking system 1120*b* that he is present at location 115 (e.g., by contacting the game networking system 1120*b* directly through the use of a digital communications device owned by the user 101). In another example, the user 101 could indirectly inform game networking system 1120*b* that he is present at location 115 (e.g., by permitting the game networking system 1120*b* to track his location through the use of Global Positioning Service (GPS) positioning based on a communications device owned by the user 101).

In one embodiment, game networking system 1120*b* can verify the presence of user 101 at location 115 through the use of a Global Positioning Service (GPS) device. For example, the user 101 could own a mobile client system 1130 (e.g., a cell phone, pager, laptop, or tablet) that is in communication with a GPS system and game networking system 1120*b* through a network. Game networking system 1120*b* could then track the physical presence of the user 101 relative to one or more locations 115. In another example, the mobile client system 1130 could be in communication with a UPS system and location networking system 1120*a* through a network. Location networking system 1120*a* could then track the physical presence of the user 101 relative to one or more locations 115. Location networking system 1120*a* could then inform game networking system 1120*b* of the physical presence of the user 101 relative to the location 115.

In another embodiment, game networking system 1120*b* can verify the presence of user 101 at location 115 through the use of a third-party application, such as a social networking site (e.g., Facebook, Twitter), a location tracking site (e.g., Foursquare, Google Latitude), a location reservation site (e.g., OpenTable, Expedia), etc. For example, the application could notify game networking system 1120*b* of the physical position of the user 101 relative to location 115 based on data received from the site. In another example, the application could notify location networking system 1120*a* of the physical position of the user 101 relative to the location 115 based on data received from the site. Location networking system 1120*a* could inform game networking system 1120*b* of the physical position of the user 101 relative to the location 115.

In yet another embodiment, game networking system 1120*b* can verify the presence of user 101 at location 115 through the use of codes (e.g., numerical codes, QR Codes, bar codes). For example, game networking system 1120*b* could provide the user 101 with a code that the user 101 can take to location 115 and that the user 101 can input into a computing system (e.g., a cash register, computer), which can be transmitted to location networking system 1120*a* and/or game networking system 1120*b* to indicate the location 115 of the user 101. In another example, the location operator can provide the user 101 with a code that the user 101 can input into his client system 1130, which will transfer an indication of the user 101's location 115 to location networking system 1120*a* and/or game networking system 1120*b*.

Systems and Methods

In various example embodiments, one or more described web pages may be associated with a networking system or networking service. However, alternate embodiments may have application to the retrieval and rendering of structured documents hosted by any type of network-addressable resource or web site. Additionally, as used herein, a "user" may be an individual, a group, or an entity (such as a business or third party application).

Figure 12:
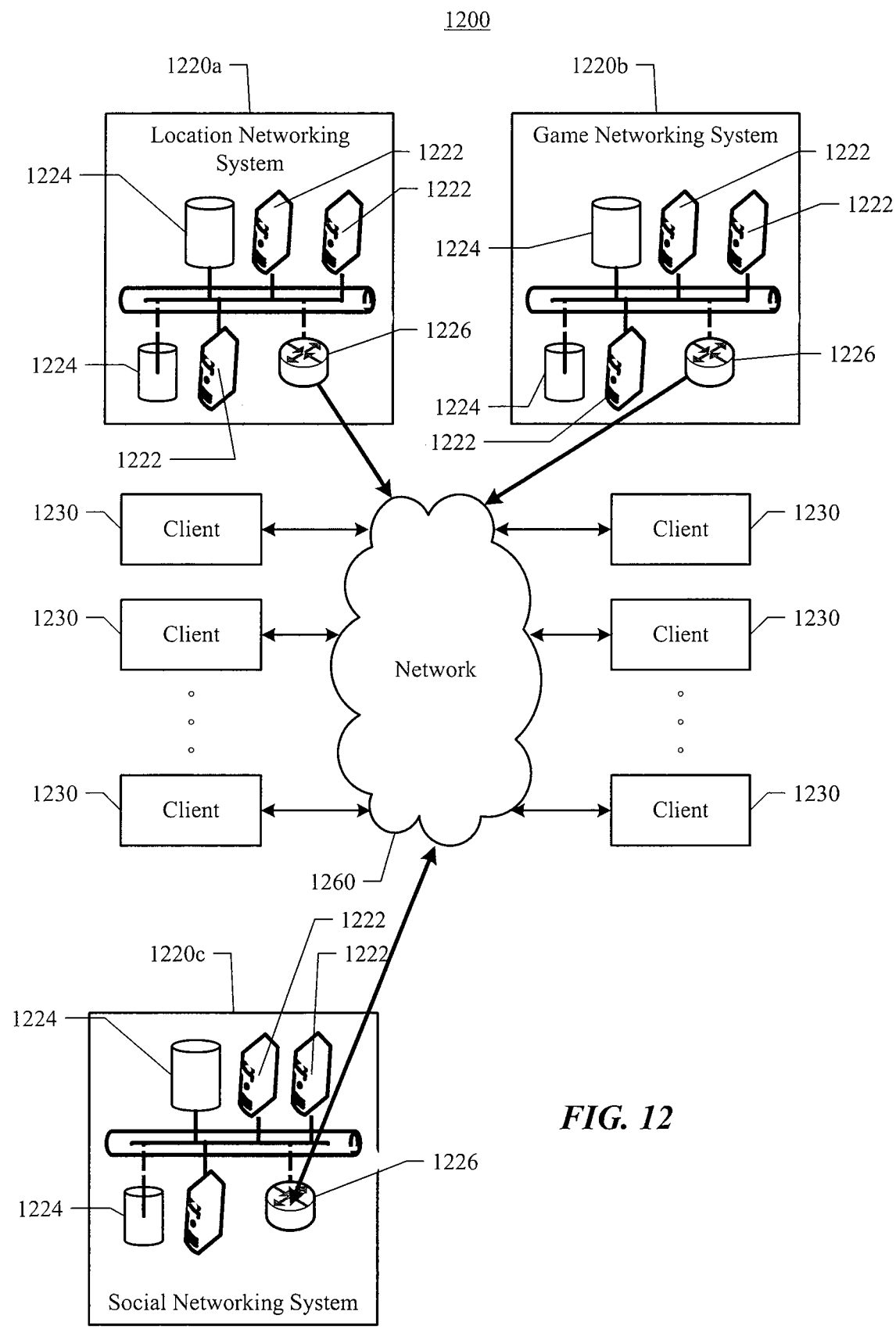
FIG. 12 illustrates an example network environment in which various example embodiments may operate.

Particular embodiments may operate in a wide area network environment 1200, such as the Internet, including multiple network addressable systems. FIG. 12 illustrates an example network environment in which various example embodiments may operate. Network cloud 1260 generally represents one or more interconnected networks, over which the systems and hosts described herein can communicate. Network cloud 1260 may include packet-based wide area networks (such as the Internet), private networks, wireless networks, satellite networks, cellular networks, paging networks, and the like. As FIG. 12 illustrates, particular embodiments may operate in a network environment comprising one or more networking systems, such as location networking system 1220*a*, game networking system 1220*b*, social networking system 120*c*, and one or more client devices 1230. The components of location networking system 1220*a*, game networking system 1220*b*, and social networking system 120*c* may operate analogously; as such, hereinafter they may be referred to simply as networking system 1220. Client devices 1230 are operably connected to the network environment via a network service provider, a wireless carrier, or any other suitable means.

Networking system 1220 is a network-addressable system that, in various example embodiments, comprises one or more physical server(s) 1222 and data store(s) 1224. The one or more physical server(s) 1222 are operably connected to network cloud 1260 via, by way of example, a set of routers and/or networking switches 1226. In an example embodiment, the functionality hosted by the one or more physical server(s) 1222 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (MAIL), Extensible Markup Language (XML), Java, JavaScript, Asynchronous JavaScript and XML (AJAX), Flash, ActionScript, and the like.

Physical server(s) 1222 may host functionality directed to the operations of networking system 1220. Hereinafter server(s) 1222 may be referred to as server 1222, although server 1222 may include numerous servers hosting, for example, networking system 1220, as well as other content distribution servers, data stores, and databases. Data store(s) 1224 may store content and data relating to, and enabling, operation of networking system 1220 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store(s) 1224 corresponds to one or more of a variety of separate and integrated databases, such as relational databases and object-oriented databases, that maintain information as an integrated collection of logically related records or files stored on one or more physical systems. Structurally, data store(s) 1224 may generally include one or more of a large class of data storage and management systems. In particular embodiments, data store(s) 1224 may be implemented by any suitable physical system(s) including components such as one or more database servers, mass storage media, media library systems, storage area networks, data storage clouds, and the like. In one example embodiment, data store(s) 1224 includes one or more servers, databases (e.g., MySQL), and/or data warehouses. Data store(s) 1224 may include data associated with different networking system 1220 users and/or client devices 1230.

Client device 1230 is generally a computer or computing device including functionality for communicating (e.g., remotely) over a computer network. Client device 1230 may be a desktop computer, laptop computer, personal digital assistant (PDA), in- or out-of-car navigation system, smart phone or other cellular or mobile phone, or mobile gaming device, among other suitable computing devices. Client device 1230 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client device 1230 to enter addresses of specific network resources to be retrieved, such as resources hosted by networking system 1220. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client device 1230 desires to view a particular webpage (hereinafter also referred to as target structured document) hosted by networking system 1220, the user's web browser, or other document rendering engine or suitable client application, formulates and transmits a request to networking system 1220. The request generally includes a URL or other document identifier as well as metadata or other information. By way of example, the request may include information identifying the user, such as a user ID, as well as information identifying or characterizing the web browser or operating system running on the user's client device 1230. The request may also include location information identifying a geographic location of the user's client device 1230 or a logical network location of the user's client device 1230. The request may also include a timestamp identifying when the request was transmitted.

The example network environment described above and in FIG. 12 is presented with respect to location networking systems and game networking systems. One skilled in the art would appreciate that these are presented merely as an example of a network environment between two types of online systems. However, the present disclosure is intended to encompass network environments that include a game networking system and a variety of other online systems, such as online media systems, online reviewing systems, online search engines, and online advertising systems. The example network environment described above performs analogously with these other online systems as with location networking systems.

Figure 13:
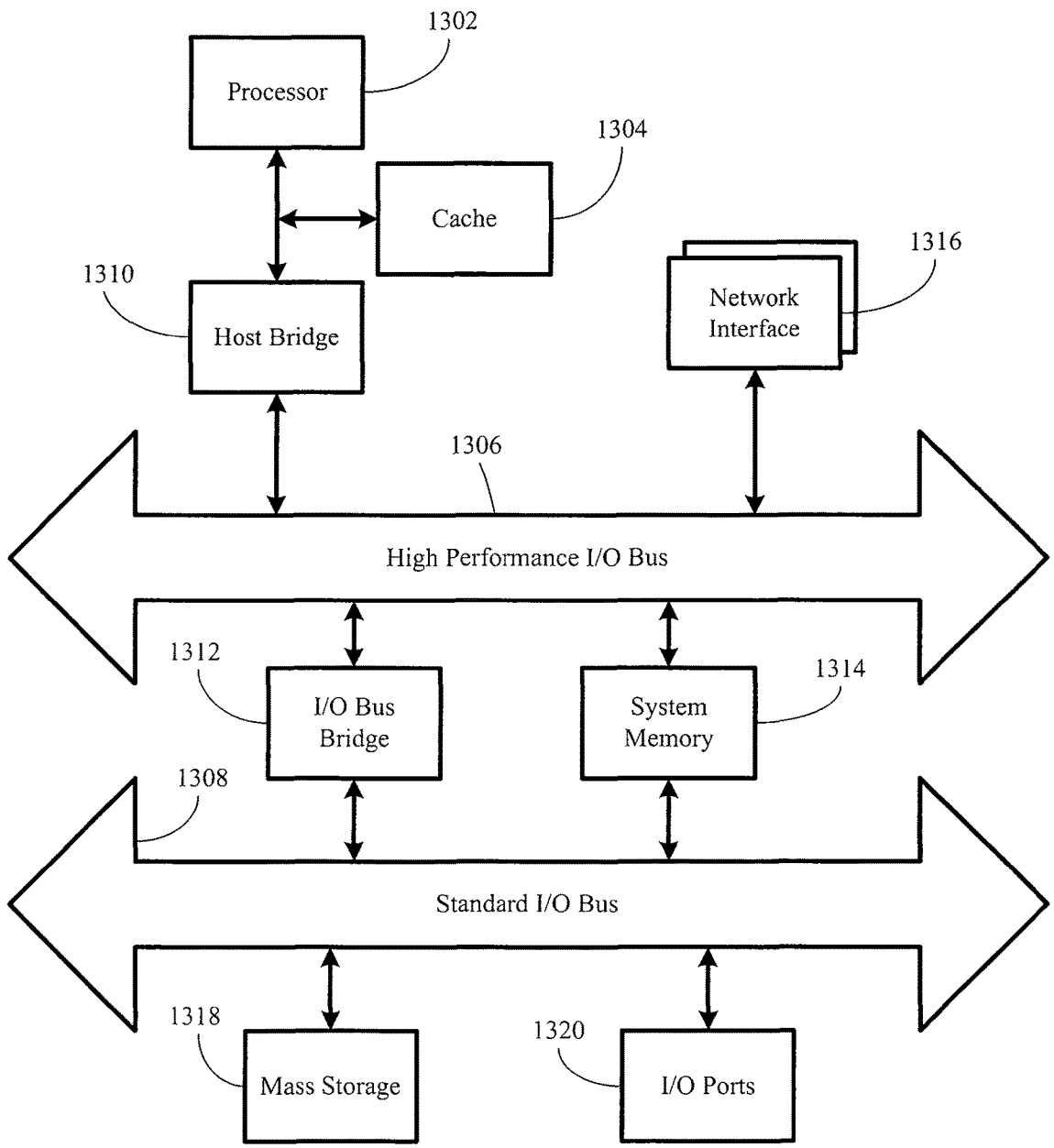
FIG. 13 illustrates an example computing system architecture, which may be used to implement a server or client device.

FIG. 13 illustrates an example computing system architecture, which may be used to implement the server 1222 or client device 1230 shown in FIG. 12. In one embodiment, hardware system 1300 comprises a processor 1302, a cache memory 1304, and one or more executable modules and drivers, stored on a tangible computer readable medium, directed to the functions described herein. Additionally, hardware system 1300 may include a high performance input/output (I/O) bus 1306 and a standard I/O bus 1308. A host bridge 1310 may couple processor 1302 to high performance I/O bus 1306, whereas I/O bus bridge 1312 couples the two buses 1306 and 1308 to each other. A system memory 1314 and one or more network/communication interfaces 1316 may couple to bus 1306. Hardware system 1300 may further include video memory (not shown) and a display device coupled to the video memory. Mass storage 1318 and I/O ports 1320 may couple to bus 1308. Hardware system 1300 may optionally include a keyboard, a pointing device, and a display device (not shown) coupled to bus 1308. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1300 are described in greater detail below. In particular, network interface 1316 provides communication between hardware system 1300 and any of a wide range of networks, such as an Ethernet (e.g., IEEE 802.3) network, a backplane, etc. Mass storage 1318 provides permanent storage for the data and programming instructions to perform the above-described functions implemented in servers 1222, whereas system memory 1314 (e.g., DRAM) provides temporary storage for the data and programming instructions when executed by processor 1302. I/O ports 1320 are one or more serial and/or parallel communication ports that provide communication between additional peripheral devices, which may be coupled to hardware system 1300.

Hardware system 1300 may include a variety of system architectures, and various components of hardware system 1300 may be rearranged. For example, cache memory 1304 may be on-chip with processor 1302. Alternatively, cache memory 1304 and processor 1302 may be packed together as a "processor module," with processor 1302 being referred to as the "processor core." Furthermore, certain embodiments of the present disclosure may not require nor include all of the above components. For example, the peripheral devices shown coupled to standard bus 1308 may couple to high performance I/O bus 1306. In addition, in some embodiments, only a single bus may exist, with the components of hardware system 1300 being coupled to the single bus. Furthermore, hardware system 1300 may include additional components, such as additional processors, storage devices, or memories.

An operating system manages and controls the operation of hardware system 1300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.
Miscellaneous One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a particular type of computer-implemented meta game (e.g., a leader board or a battle game), the embodiments can be applied to any type of computer-implemented meta game. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   obtaining information on an action occurring in a computer-implemented game;
   reflecting the action in a meta game by altering a state of a player in the meta game, wherein operations of the meta game are performed on a server system configured to provide gaming to one or more user devices and wherein the meta game corresponds to the computer-implemented game and enables at least one gaming event that is unsupported by the computer-implemented game; and
   causing display of a result of the action in a graphical user interface for the meta game on one of the one or more user devices.

2. The method of claim 1, wherein the action changes territory assigned to the player.

3. The method of claim 1, wherein the action changes one or more virtual assets assigned to the player.

4. The method of claim 1, wherein a social network wrapper associated with the meta game enables communication with members of a social network.

5. The method of claim 1, further comprising reflecting, in a leaderboard meta game, an action performed in the meta game.

6. The method of claim 1, further comprising linking the computer-implemented game with the meta game.

7. The method of claim 1, further comprising detecting that the action within the computer-implemented game was performed at a location associated with the meta game.

8. The method of claim 1, wherein the meta game includes a competition between a first group of users of the computer-implemented game and a second group of users of the computer-implemented game, the first group of users being associated with a first location and the second group of users being associated with a second location.

9. The method of claim 1, further comprising notifying a user of an incentive to participate in the meta game, the incentive based on an advertising campaign of a business at a location.

10. The method of claim 1, wherein the meta-game is a battle game and the reflecting in the meta game of the action within the computer-implemented game includes advancing a progress of a player in the battle game based on a score of the player of the computer-implemented game being higher than a score of an additional player of the computer-implemented game, the additional player being an opponent of the player with respect to the battle game.

11. The method of claim 10, wherein the advancing of the progress of the player in the battle game includes advancing a progress of an alliance of the player in the battle game.

12. A system comprising:
a processor-implemented game networking system configured to perform operations comprising:
obtaining information on an action occurring in a computer-implemented game;
reflecting the action in a meta game by altering a state of a player in the meta game, wherein operations of the meta game are performed on a server system configured to provide gaming to one or more user devices and wherein the meta game corresponds to the computer-implemented game and enables at least one gaming event that is unsupported by the computer-implemented game; and
causing display of a result of the action in a graphical user interface for the meta game on one of the one or more user devices.

13. The system of claim 12, wherein the action changes territory assigned to the player.

14. The system of claim 12, wherein the action changes one or more virtual assets assigned to the player.

15. The system of claim 12, wherein a social network wrapper associated with the meta game enables communication with members of a social network.

16. The system of claim 12, the operations further comprising reflecting, in a leaderboard meta game, an action performed in the meta game.

17. The system of claim 12, further comprising detecting that the action within the computer-implemented game was performed at a location associated with the meta game.

18. The system of claim 12, wherein the meta game includes a competition between a first group of users of the computer-implemented game and a second group of users of the computer-implemented game, the first group of users being associated with a first location and the second group of users being associated with a second location.

19. The system of claim 12, wherein the meta-game is a battle game and the reflecting in the meta game of the action within the computer-implemented game includes advancing a progress of a player in the battle game based on a score of the player of the computer-implemented game being higher than a score of an additional player of the computer-implemented game, the additional player being an opponent of the player with respect to the battle game.

20. A non-transitory machine-readable storage medium embodying a set of instructions that, when executed by at least one processor, causes the processor to perform operations, the operations comprising:
obtaining information on an action occurring in a computer-implemented game;
reflecting the action in a meta game by altering a state of a player in the meta game, wherein operations of the meta game are performed on a server system configured to provide gaming to one or more user devices and wherein the meta game corresponds to the computer-implemented game and enables at least one gaining event that is unsupported by the computer-implemented game; and
causing display of a result of the action in a graphical user interface for the meta game on one of the one or more user devices.

* * * * *